E. OLSSON.
IRRIGATION APPARATUS.
APPLICATION FILED NOV. 16, 1908.
958,937.
Patented May 24, 1
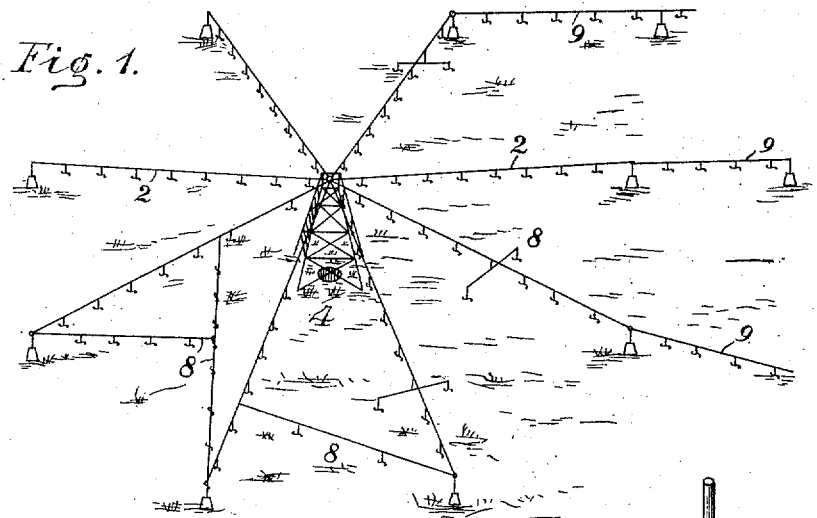
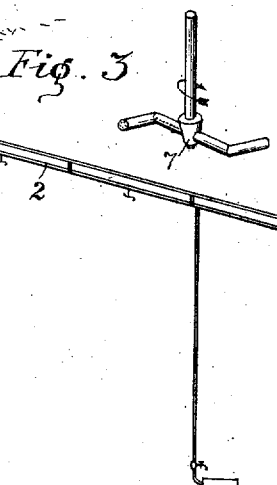
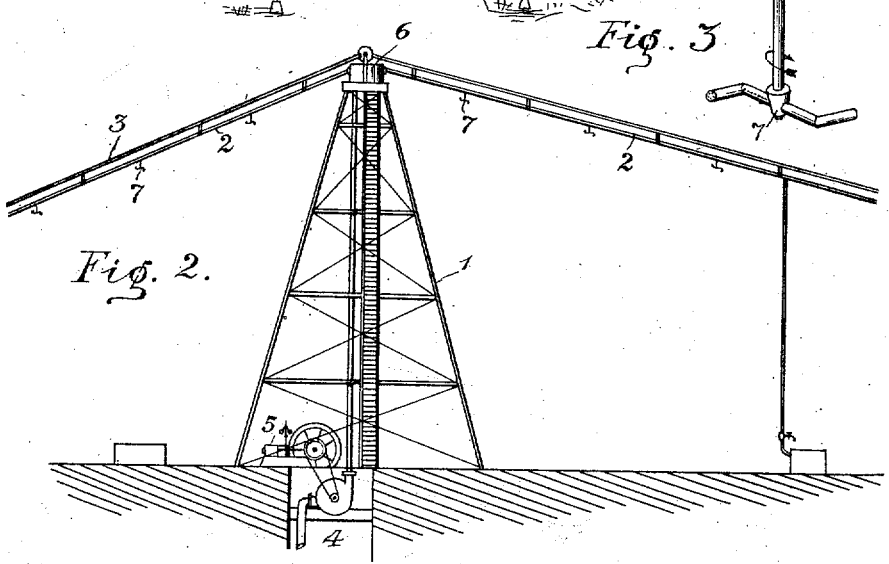

UNITED STATES PATENT OFFICE.

EMILIO OLSSON, OF BUENOS AYRES, ARGENTINA.

IRRIGATION APPARATUS.

958,937.  Specification of Letters Patent.  Patented May 24, 1910.

Application filed November 16, 1908. Serial No. 462,961.

*To all whom it may concern:*

Be it known that I, EMILIO OLSSON, a subject of the King of Sweden, and residing in the city of Buenos Ayres, Argentina, have invented new and useful Improvements in Irrigation Apparatus, of which the following is a specification.

This invention relates to an irrigation apparatus for plantations, gardens and such like.

An object of the invention is to provide irrigation for a tract of land in the form of an artificial rain; other objects will be more clearly understood by reference to the following specification and claim, in connection with the accompanying drawing.

In the drawing: Figure 1 is a perspective view of an embodiment of this invention. Fig. 2 is an elevation of the main parts of the same. Fig. 3 is a perspective view of a detail.

As may be seen from Figs. 1 and 2 a plurality of pipes 2 extend preferably radially from the top of a scaffold or tower 1, the pipes in Fig. 2 being shown suspended from a plurality of cables or rods 3. A pump 4 driven by some suitable motor 5 is placed at the bottom of the tower 2 and conveys water to a container or tank 6 on the top of said tower, the pipes 2 being connected to said tank. A plurality of rotary sprayers 7 shown in detail in Fig. 3 are connected to pipes 2, and these sprayers are adapted to be rotated by the re-active force of the water leaving the same. These sprayers advisably consist of a downwardly extending pipe, at the lower end of which a preferably horizontal pipe is mounted rotatably. The ends of the horizontal pipe are provided with
angular extension pieces pointing in opposite directions. A liquid leaving the extension pipe under pressure exerts a re-active force in opposite direction to the direction of the extension and thereby it may impart rotatory movement to the horizontal pipe. In the spraying device of this invention the horizontal pipe, and the angular extensions are provided with a large plurality of fine apertures, so that the water is discharged over the field in a fine distributed spray.

As may be seen from Fig. 1 branch pipes 8 and extension pipes 9 may be connected to pipes 2 for the purpose of obtaining a more intensive irrigation of the tract of land, on which the device is erected. The pipes 2 may be anchored at their free end in some suitable way.

I claim—

An irrigation apparatus comprising a tower, a container at the top of said tower, a plurality of cables extending radially from said tower, a plurality of pipes extending from said container and being suspended from said cables, a plurality of branch pipes interconnecting said first mentioned pipes, means for elevating water to the top of said tower and a plurality of spraying devices connected to each of said pipes and branch pipes, said spraying devices being adapted to be rotated by the re-active force of the discharged water.

In testimony whereof I affix my signature in presence of two witnesses.

EMILIO OLSSON.

Witnesses:
 JOSÉ T. GAUARDO,
 JOSÉ ROBLES.